(12) United States Patent
Lazenby et al.

(10) Patent No.: US 7,695,438 B2
(45) Date of Patent: Apr. 13, 2010

(54) ACOUSTIC DISRUPTION MINIMIZING SYSTEMS AND METHODS

(75) Inventors: John C. Lazenby, Fall City, WA (US); Robert N. Phelps, Fall City, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1457 days.

(21) Appl. No.: 10/854,585

(22) Filed: May 26, 2004

(65) Prior Publication Data

US 2005/0267369 A1    Dec. 1, 2005

(51) Int. Cl.
  *A61B 8/00* (2006.01)
(52) U.S. Cl. ............... 600/447; 600/437; 600/440; 600/441; 600/442; 600/443; 600/444; 600/445; 600/446; 600/448; 600/449; 600/450; 600/451; 600/452; 600/453; 600/454; 600/455; 600/456; 600/457; 600/458; 310/317; 310/319; 310/322; 310/334; 310/337; 73/625; 73/626
(58) Field of Classification Search ............ 600/443, 600/437, 440–458; 310/317, 319, 322, 334–337; 73/625, 626
See application file for complete search history.

(56) References Cited

U.S. PATENT DOCUMENTS

| | | | | |
|---|---|---|---|---|
| 6,036,650 A | * | 3/2000 | Wu et al. | 600/462 |
| 6,104,670 A | * | 8/2000 | Hossack et al. | 367/7 |
| 6,108,572 A | * | 8/2000 | Panda et al. | 600/407 |
| 6,159,153 A | * | 12/2000 | Dubberstein et al. | 600/443 |
| 6,193,662 B1 | * | 2/2001 | Hwang | 600/447 |
| 6,340,348 B1 | * | 1/2002 | Krishnan et al. | 600/447 |
| 6,491,633 B1 | * | 12/2002 | Krishnan et al. | 600/447 |
| 6,806,623 B2 | * | 10/2004 | Petersen et al. | 310/334 |
| 6,891,311 B2 | | 5/2005 | Phelps et al. | |
| 6,958,042 B2 | * | 10/2005 | Honda | 600/458 |
| 7,105,981 B2 | * | 9/2006 | Lazenby | 310/317 |
| 2005/0131298 A1 | | 6/2005 | Cai et al. | |

* cited by examiner

*Primary Examiner*—Brian Casler
*Assistant Examiner*—John F Ramirez

(57) ABSTRACT

Unipolar, bipolar or sinusoidal transmitters may leave the transmitter in any of various states at the end of one pulse. Undesired acoustic energy may be generated to change states prior to beginning another transmit sequence or pulse. For example, phase inversion for tissue harmonic imaging is performed where two sequential pulses are transmitted with different phases. The first waveform starts at a low state and ends at the low state of a unipolar transmitter. The next waveform starts at the high state. Transmit apodization or spectrum control techniques may require a pattern of waveform starting states different than a current state. Acoustic disruption due to a change of state of the transmitter between transmissions for imaging is minimized. The acoustic disruption is minimized by focusing the acoustic energy generated by the switch of states away from a scan line or scan lines being used for imaging or by defocusing the energy within the scan region generated due to the switching of states of the transmitter between acquisition cycles.

25 Claims, 3 Drawing Sheets

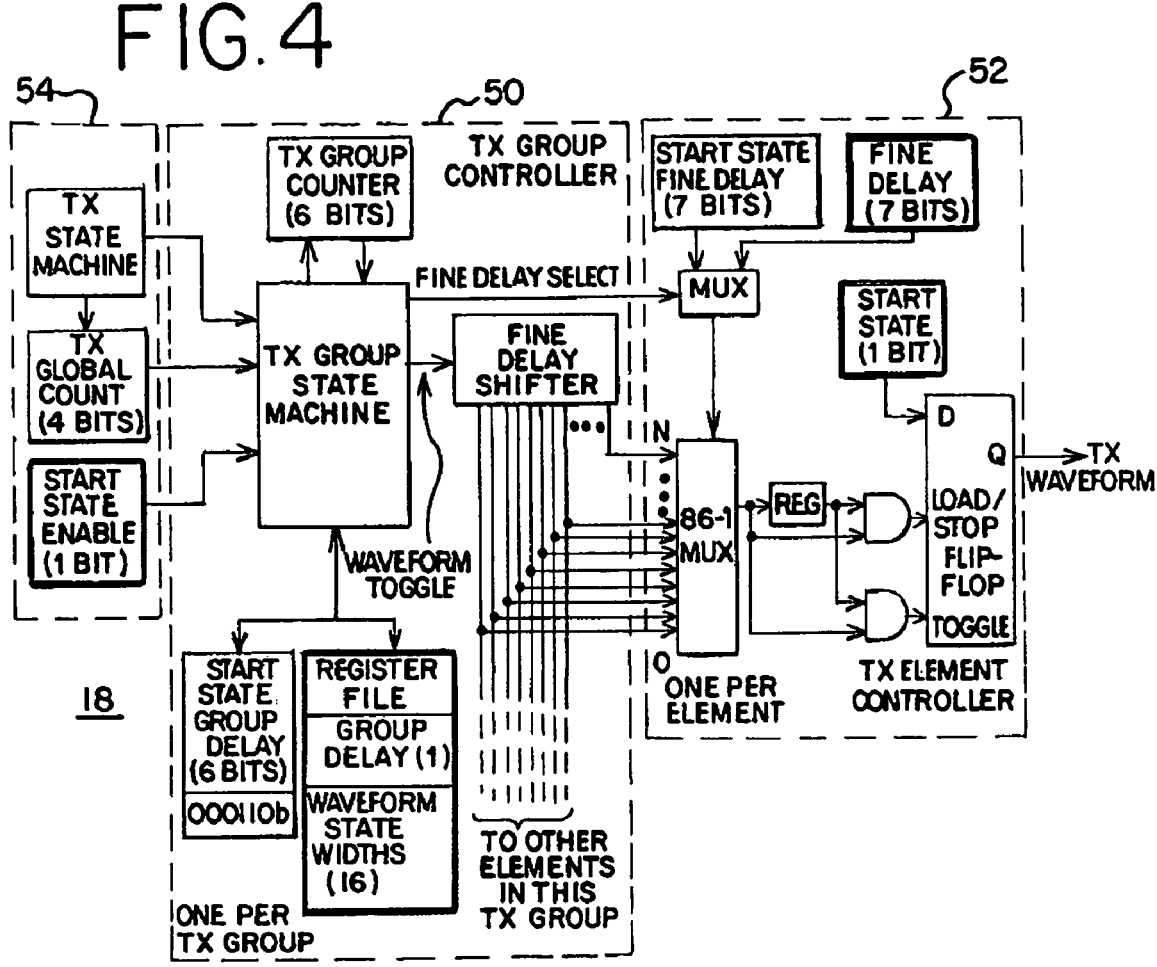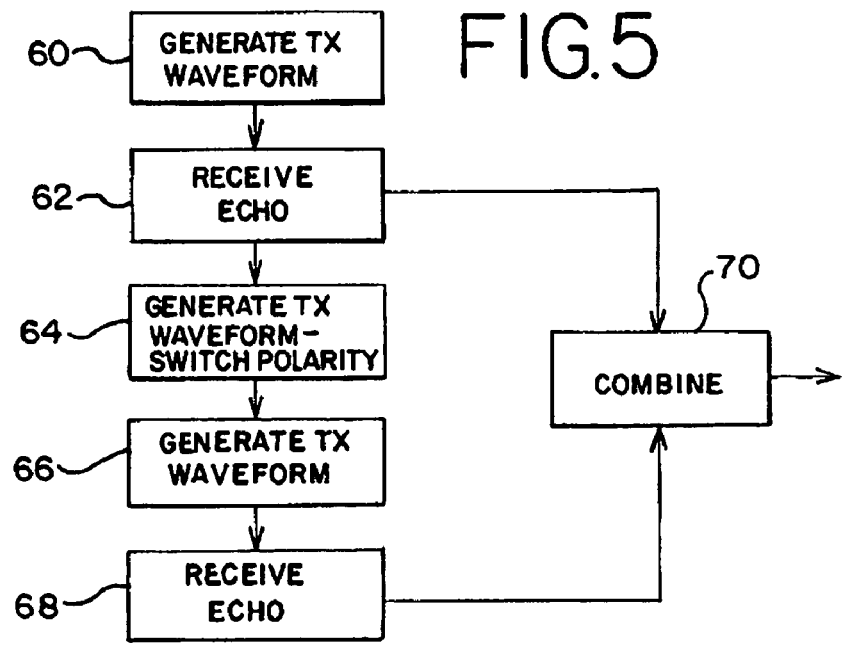

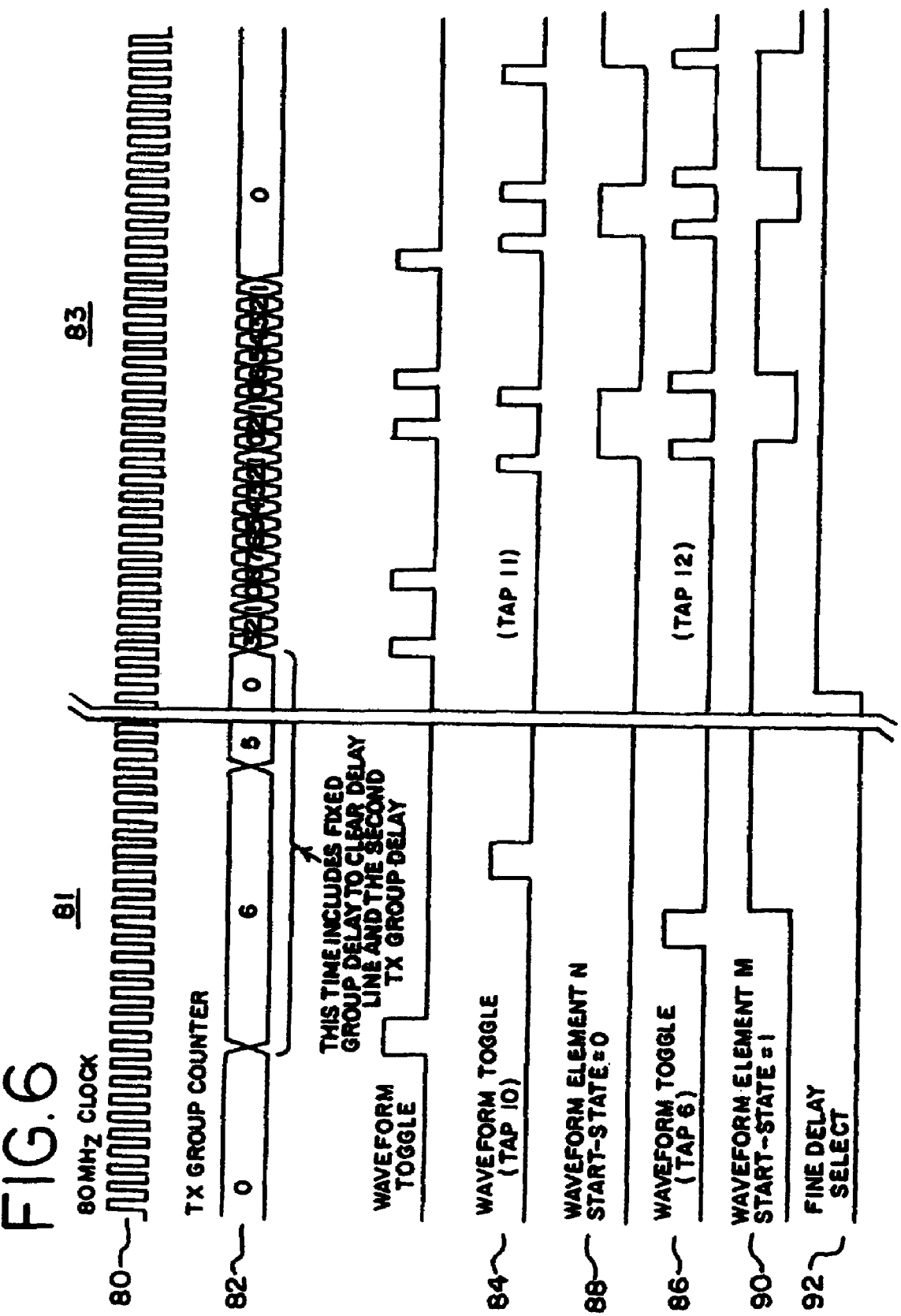

ACOUSTIC DISRUPTION MINIMIZING SYSTEMS AND METHODS

BACKGROUND

The present invention relates to acoustic transmission in ultrasound imaging. In particular, systems and methods for minimizing acoustic disruption for ultrasound imaging are provided.

For ultrasound imaging, acoustic energy is transmitted from a transducer array. Using apodization and delay profiles, the acoustic energy is focused along one or more scan lines. Other acoustic energy is minimized to avoid interfering with the desired transmitted acoustic energies and associated echoes. For example, a backing block on a transducer prevents reflection of acoustic energy radiating away from a patient in order to avoid artifacts. As another example, the acoustic energy is generated in response to unipolar, bipolar or other waveforms generated electronically. Various filters or other electrical structures are provided to prevent undesired generation of acoustic energy due to noise within the electrical waveform.

Typically, transmit and receive processes are performed sequentially. A transmit and receive switch alternates between connection of the transducer array with the transmit and receive circuitry. The transmit circuitry is a transistor, transistor network, amplifier, digital-to-analog converter or other structure for generating a unipolar, bipolar or sinusoidal waveform. The transmit circuitry is positioned within an imaging system. Each new transmit waveform is generated independently of a previous transmit waveform. Any configuration of the transmit circuitry may occur while the transmit and receive switch is connected with the receive circuitry, avoiding generation of undesired acoustic energy in response to transmit circuit configuration.

A transmit and receive switch may be unavailable. For example, U.S. Pat. No. 6,806,623 (application Ser. No. 10/185,404), the disclosure of which is incorporated herein by reference, discloses a transmit circuit connected with a transducer element where the transducer element is used to isolate the transmit circuitry from the receive circuitry. Instead of providing for high voltage transmit and receive switching, the transducer element isolates the transmit and receive channels. The transmitter may be left in any of the operable states, such as a high, low or zero voltage state of a bipolar pulser. For a sequential transmission, the transmitter begins from the last used state. However, some transmission techniques rely on the transmitter being operable to begin in a different state then in a last ended state.

BRIEF SUMMARY

By way of introduction, the preferred embodiments described below include methods and systems for minimizing acoustic disruption. Unipolar, bipolar or sinusoidal transmitters may leave the transmitter in any of various states at the end of one pulse. Undesired acoustic energy may be generated to change states prior to beginning another transmit sequence or pulse. For example, phase inversion for tissue harmonic imaging is performed where two sequential pulses are transmitted with different phases. The first waveform starts at a low state and ends at the low state of a unipolar transmitter. The next waveform starts at the high state. Transmit apodization or spectrum control techniques may require a pattern of waveform starting states different than a current state.

Methods and systems for minimizing acoustic disruption due to change of states of the transmitter between transmissions for imaging are provided. The acoustic disruption is minimized by focusing the acoustic energy generated by the switch of states away from a scan line or scan lines being used for imaging or by defocusing the energy within the scan region generated due to the switching of states of the transmitter between acquisition cycles.

In a first aspect, a beamformer system is provided for minimizing acoustic disruption in ultrasound imaging. A transmit beamformer is operable to sequentially generate first and second transmissions of acoustic energy in response to first and second delay patterns, respectively. The first delay pattern corresponds to minimizing acoustic energy in a region of interest. The second delay pattern corresponds to focusing acoustic energy along a scan direction within the region of interest. A receive beamformer is operable to receive echo signals in response to the second transmission and substantially avoid receiving echo signals in response to the first transmission.

In a second aspect, a method is provided for minimizing acoustic disruption in ultrasound imaging. A first transmit waveform is generated with a first transmitter. The first transmitter begins at a first beginning state and ends at a first ending state for the first transmit waveform. A second transmit waveform is generated with the first transmitter. The second transmit waveform begins at the first ending state and ends at a second ending state different than the first ending state. A third transmit waveform is generated with the first transmitter. The third transmit waveform begins at the second ending state.

In a third aspect, a method for minimizing acoustic disruption is provided for ultrasound imaging. A first transmission is generated in response to a first delay pattern. The first delay pattern corresponds to minimizing acoustic energy in a region of interest. A second transmission is generated in response to a second delay pattern. The second delay pattern corresponds to focusing acoustic energy along a scan direction within the region of interest. Echo signals are received in response to the second transmission, and receiving echo signals in response to the first transmission is substantially avoided.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 4 is a block diagram of one embodiment of a controller of a transmitter beamformer;

FIG. 5 is a flow chart diagram of one embodiment of a method for minimizing acoustic disruption in ultrasound imaging; and FIG. 6 is a timing diagram showing one embodiment of minimizing acoustic disruption by changing states of a transmitter between acquisition cycles.

DETAILED DESCRIPTION OF THE DRAWINGS AND PRESENTLY PREFERRED EMBODIMENTS

Where configuration of a transmitter results in generation of undesired acoustic energy, two independent transmissions are generated. The first transmit generation configures the transmitters into the desired start state for the second transmission while minimizing the impact of the generated acoustic energy on imaging performance. For example, the acoustic energy is transmitted away from an imaging region or defocused to have minimal impact on the imaging region. The subsequent transmission for imaging may occur quickly without a lengthy delay sufficient to allow echoes to die out.

Figure 1:
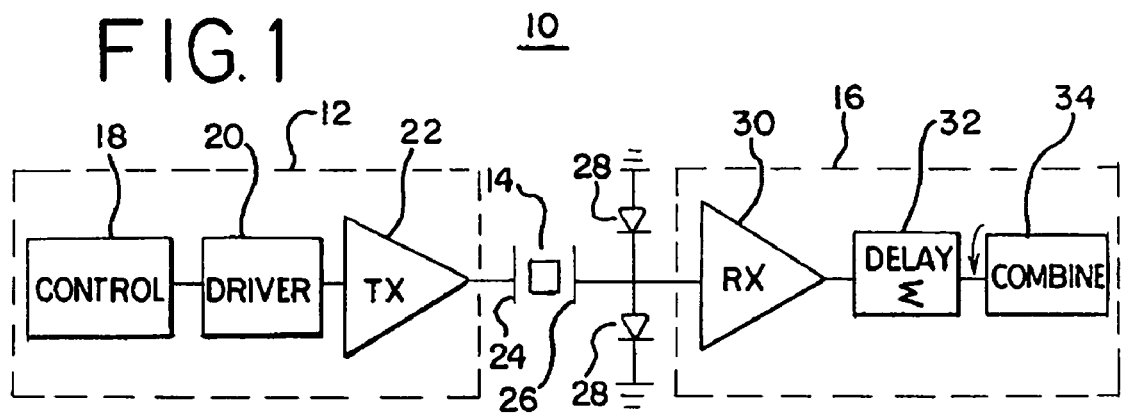
FIG. 1 is a block diagram of one embodiment of a beamformer system for minimizing acoustic disruption.

FIG. 1 shows one embodiment of a system 10 that includes a transmit beamformer 12, a transducer element 14 and a receive beamformer 16 with optional diodes 28. Additional, different or fewer components may be provided. While shown as single transmit and receive channels and the associated element 14, additional channels and elements 14 may be provided for a one-dimensional, two-dimensional, multi-dimensional, annular or other now known or later developed arrays. In one embodiment, the system 10 is at least partially or entirely within a transducer assembly, such as within a transducer probe that is disconnectable from an imaging system. For example, the system 10 is one or more of the embodiments disclosed in U.S. Pat. No. 6,806,623 (application Ser. No. 10/185,404), the disclosure of which is incorporated herein by reference. In another embodiment, the controller 18, part of the controller 18 or none of the controller 18 is within the transducer probe with the additional driver 20 and transmitter 22 of the transmit beamformer. Alternatively, all or part of the transmit beamformer 12, receive beamformer 16 or combinations thereof are within an imaging system separable from the probe.

The transducer element 14 is a piezoelectric, capacitive membrane, or other now known or later developed device or material for transducing between electrical and acoustic energies. The element 14 includes electrodes 24 and 26. In the embodiment shown in FIG. 1, the transmit beamformer 12 connects with one electrode 24, and the receive beamformer 16 connects with the other electrode 26. The transducer element 14 acts to isolate the transmit circuitry from the receive circuitry. For example, the diodes 28 clamp the receive circuitry electrode 26 to near a ground potential relative to the high voltage transmit circuits and waveform. During receive operation, the transmitter is held at a constant potential, such as a positive, negative or zero DC voltage. In alternative embodiments, the transmit beamformer 12 and receive beamformer 16 connect with a same electrode 24 and the other electrode 26 is connectable with ground or other potential.

The transmit beamformer 12 includes the control 18, the driver 20 and the transmitter 22. Additional, different or fewer components may be provided. For example, a delay or phase rotator is provided for implementing relative delay profiles across a plurality of transmit beamformer channels. The transmit beamformer 12 is operable to sequentially generate transmissions of acoustic energy in response to different delay patterns. For example, changes in voltage are communicated to the transducer element 14 to generate transmission of acoustic energy. The controller 18 provides signals to the driver 20 for driving the transmitter 22 to generate the electrical waveform signals for generating the transmission of acoustic energy.

Figure 2:
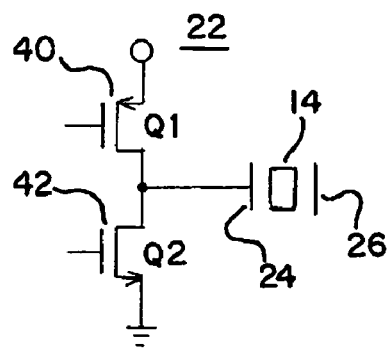
FIG. 2 is a circuit diagram showing one embodiment of a unipolar transmitter.

In one embodiment, the transmitter 22 is a unipolar transmitter switchable between high and low states. For example, FIG. 2 shows two transistors 40 and 42 connected with one of the electrodes 24 of the element 14. One transistor 40 connects the electrode 24 to a high DC voltage source, and the other transistor 42 connects the electrode 24 to a ground or other lower potential. By switching the electrode 24 between connections to the high voltage source and the ground potential, a unipolar transmit waveform is generated. In the embodiment shown in FIG. 2, the high state is a high voltage state and the low state is a ground state. In alternative embodiments, the high voltage state is a positive, zero or negative voltage and the low voltage state is a lower, positive, zero or negative voltage. The transmitter 22 is operable to end transmission in either of the two states. The beginning of a transmission may be in the same or different of the two states as the end. For example, a 1½ cycle waveform is generated by switching between a low state to a high state, the high state to the low state and the low state to the high state. Other lengths of waveforms may be used.

Figure 3:
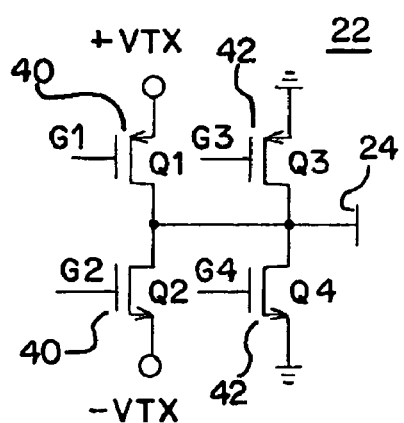
FIG. 3 is a circuit diagram showing one embodiment of a bipolar transmitter.

FIG. 3 shows another example embodiment of the transmitter 22. The circuit of FIG. 3 includes a plurality of transistors 40, 42 for generating a bipolar waveform. In addition to connections to a ground potential, two different transistors 40 connect to positive and negative voltage sources. Both positive or both negative voltage source configurations may be used. One or more of the transistors 40, 42 may have an integral reverse diode from the drain to the source. The transistors Q3 and Q4 shown in FIG. 3 avoid the reverse diode configuration to avoid conducting through the diodes. Other configurations and networks of transistors 40, 42 may be used. The bipolar waveform transmitter 22 shown in FIG. 3 is operable to generate a bipolar waveform having three possible states, a high state, a low state and a zero state. The ending state of a bipolar waveform may be the same or different than the beginning state, depending on the waveform generated.

The driver 20 is a transistor or FET driver for controlling operation of the transmitter 22. In alternative embodiments, other drivers may be used. The driver 20 is integrated as part of an application specific integrated circuit, such as with the transmitter 22 and/or the controller 18, but may have separate devices or comprise a general processor. The driver 20 is operable to provide voltage changes for operating the transistors 40, 42. For example, the transistor Q2 of FIG. 2 is controlled by application of a 10 volt or zero volt signal from the driver 20. The transistor Q1 is controlled by application of a Voltage equal to the DC Voltage at the source or a Voltage 10 Volts less than the DC Voltage at the source from the driver.

The controller 18 is a general processor, analog component, digital component, application specific integrated circuit or combinations thereof for controlling the driver 20 associated with one or more elements 14. In one embodiment, the controller 18 is integrated on a same application specific integrated circuit as the driver 20 or drivers 20 for a plurality of elements, but a separate device may be used. The controller 18 outputs binary signals to control the operation of the driver 20 and transmitter 22. In one embodiment, the controller 18 extrapolates or selects transmit configurations or waveform parameters for an entire array or a subarray based on control signals provided externally to a transducer probe assembly.

The controller 18 controls the driver 20 and transmitter 22 for generation of different transmissions of acoustic energy. For example, a plurality of sequential waveforms is generated for transmitting acoustic energy to receive echoes for imaging. Based on relative delays and apodization between different channels of the transmit beamformer 12, the region of interest is scanned by sequential transmissions. In one embodiment, each transmission is associated with a different scan line. In alternative embodiments, a given scan line is associated with multiple transmissions. For example, the transmit and receive sequences disclosed in U.S. Pat. No. 7,105,981 (application Ser. No. 10/732,761) or (U.S. application Ser. No. 10/732,136), the disclosures of which are incorporated herein by reference, may be used. For example, two or more transmissions of acoustic energy are focused along a substantially same scan line but with different polarity or phasing. Substantially is used herein to account for focusing along adjacent scan lines, such as to avoid delays due to multiple transmissions along a same scan line. Echo responses to the multiple transmissions along the substantially the same scan lines may be used to identify desired information, such as second harmonic information. Any of various transmit and receive waveform patterns, relative phasing, relative weightings or other combinations may be used for isolating desired information.

To isolate the desired information, the ending state of a transmitter may be different than the desired beginning state for a subsequent transmission. A subset, none or all of the transmitters 22 across a transmit aperture may have ending states for one transmission sequence that are different than the desired beginning states for a subsequent transmission sequence.

The controller 18 is operable to switch the unipolar, bipolar or other transmitter 22 between different states, such as between high and low states, in preparation for a sequential transmission of acoustic energy. Switching some or all of the transmitters 22 in the transmit aperture from an ending state of one imaging transmission to a beginning state of a next imaging transmission may result in the generation of undesired acoustic energy.

The controller 18 causes the switches between states across the transmit aperture to be performed in a way minimizing acoustic disruption. For example, different delay patterns are used for imaging transmissions and for transmissions resulting from switching transmitter states between imaging transmissions. For imaging transmissions, the delay pattern corresponds to focusing acoustic energy along one or more scan directions within a region of interest.

The delay pattern used for switching states between imaging transmissions minimizes acoustic energy in the region of interest. For example, the delay pattern applied to the transmitters 22 to be switched is operable to defocus the acoustic energy. A random delay pattern or a delay pattern set to minimize peaks of acoustic interference from the different transmitters is used. By switching the transmitters to change states pursuant to a defocusing delay pattern, constructive interference from the transmitters 22 is reduced, minimized or avoided. In one embodiment, the defocusing provides less focus than provided for an imaging transmission.

In another embodiment, the delay pattern for minimizing acoustic energy focuses the acoustic energy away from scan directions for the imaging transmissions. For example, a plurality of imaging transmissions is sequentially performed along a substantially same scan line. The delay pattern for switching some or all of the transmitters in between the sequential imaging transmissions focuses the acoustic energy away from the substantially same scan line. The focus of the delay pattern associated with the switching between states is outside of a region of interest to be scanned. Alternatively, the focus is within the region of interest to be scanned but spaced away from the focus of the scan lines used for the next imaging transmission, such as 20°, 40°, 60°, 80°, 90° or other angle away from the line to be scanned. The origin of the scan line associated with the switching may be different than for the imaging transmissions to further reduce or minimize acoustic disruption.

After an imaging transmission, a transmission of acoustic energy due to switching states of one or more transmitters 22 is performed. The switching of the states is performed after reception of acoustic echoes in response to the previous imaging transmission. For example, a 100-200 microsecond delay between acoustic transmissions is provided for receiving echoes. A greater or lesser delay may be provided in other embodiments. After the receive delay, acoustic transmission due to the switching of states of the transmitters in preparation for another imaging transmission is performed. Since the acoustic disruption is minimized or otherwise reduced, a subsequent imaging transmission may follow with a lesser delay than associated with imaging. For example, a subsequent imaging transmission is performed within about fifty or fewer microseconds of the acoustic transmission due to switching the states of the transmitters 22. A greater or lesser delay may be provided. By reducing the delay from the switching states transmissions to an imaging transmission, more rapid scanning and imaging may be provided.

FIG. 4 shows one embodiment of the controller 18, but other arrangements may be used. The controller 18 is operable to control an array or subarray of elements and associated transmitters 22. The controller includes a group controller 50, a plurality of element controllers 52 and a general control section 54. The general control section 54 is common to all elements and transmitters. A general state control, global count and start state enable are provided to each group controller 50. The group controller 50 includes a clock or transmit group counter, a memory with the start state of a group delay, and a register file or memory having a group delay and waveform width. The start state of the group delay identifies whether the group delay starts on a low state, or a high state for a unipolar waveform or other states for other types of waveforms. The group delay identifies total amount of delay for a given group and the waveform width parameters identify the length and/or duty cycle of the waveforms, such as 1, 1½, 2 or other numbers of cycles. Alternatively, a set of widths that controls the amount of time that the waveform spends in each state is provided. For example, the waveform is high for 50 ns, followed by low for 350 ns, followed by high for 200 ns, low for 200 ns.

The group controller 50 also includes a state machine for indicating a desired state of each of the transmitters within the group based on the transmit group counter, start state, group delay and waveform state widths. The group state machine implements a delay value common to the group of controlled elements. A further fine delay specific to each element within the controlled group is implemented using a shift register or tapped digital delay line.

Each of the element controllers 52 for the controlled group includes a multiplexer for selecting the appropriate output or fine delay of the shift register. The multiplexer operates in response to a fine delay selection provided from the group state machine, a start state for each fine delay and the actual fine delay value from memories. The output of the multiplexer is used with logic to control the loading and stopping of a transmit waveform generation as well as toggling between states for generating the transmit waveform. The start state is stored in a memory for further control of the transmitter 22. The controller 18 shown in FIG. 4 is for a unipolar transmitter, but other controllers may be used for unipolar transmission. Different or the same controllers may be used for bipolar or other types of transmitters.

The group state machine of the group controller 50 generates the transmit waveform or transmit waveform timing. Two different group delay values and fine delay values are generated for the two different types of transmissions, such as transmissions to switch the state of a transmitter and transmissions for imaging. For a state change, a group delay and fine delay are selected to minimize acoustic disruption as discussed above. After a state change is completed and has propagated through the delay lines, a new group delay and fine delay are applied for an imaging transmit waveform. Where a switch in state is not needed for a particular element or groups of elements, group and fine delay values associated with imaging transmissions are used without state change delay patterns.

Referring again to FIG. 1, the receive beamformer 16 includes a receive amplifier 30, a delay and sum device 32 and a combiner 34. The receive amplifier 30 is a preamplifier, operational amplifier, apodization amplifier or other channel specific amplifier. The amplifier 30 is operable to apply apodization or relative weighting across a plurality of channels. The relative weighting may also be applied between sequential echoes for identifying desired spectral content through combination of information from different transmission and reception cycles. The delay and sum circuit 32 has inputs from a plurality of different receive channels and associated elements. The delay and sum circuit 32 is operable to apply relative delays between different channels. The relatively delayed signals are then summed to beamform for a given reception. Dynamic focusing may be provided.

The combiner 34 is an application specific integrated circuit, a memory, a buffer, a processor, a logic device, a summer, or other now known or later developed device for combining information from different transmission and reception cycles. The receive beamformer 16 is operable to isolate information in response to a combination of echo signals received from different transmissions. The different relative polarity and/or weighting between waveforms of the different channels and/or transmissions are used to isolate the desired information. In one embodiment, the combination is a summation or a weighted summation. Positive or negative uniform or different weights may be used. The receive beamformer 16 is operable to avoid or substantially avoid receiving acoustic energy echoed in response to an acoustic transmission due to a state change of the transmitter 22. Substantially accounts for acoustic energy echoes in response to defocused transmissions or transmissions away from a scan line of interest. By providing some delay, some echo die-down of stronger echoes is provided. The delay may be less than associated with an imaging transmission for reception, such as less than 200, less than 100 or less than 50 microseconds.

FIG. 5 shows one embodiment of a method for minimizing acoustic disruption for ultrasound imaging. Different, additional or fewer acts may be provided in the same or different order. The method of FIG. 5 is implemented using the system 10 described above or a different system. Any of unipolar, bipolar or sinusoidal waveforms are used for the method. The same or different waveforms are generated sequentially. For example, a unipolar waveform is generated for imaging, followed by a unipolar waveform generated for a change of state of the transmitters, followed by another waveform generated for imaging without intervening generation of other transmit waveforms.

In act 60, a transmit waveform is generated with a transmitter. The transmitter begins at one state and ends at the same or a different state. A waveform with a given polarity is generated. Waveform generation is repeated substantially simultaneously for each of a plurality of channels in an aperture. Substantially simultaneously is used to account for focusing delays as well as delays due to noise or manufacturing variation. A delay profile is applied across the aperture. The delay profile is operable to focus the transmitted acoustic energy substantially along a scan line within a region of interest. Each of the generated waveforms has a beginning and ending state of a transmitter. In one embodiment, each transmitter begins and ends at a same state within the entire transmit aperture. In alternative embodiments, one or more of the transmitters within the transmit aperture begins and/or ends in a different state than other transmitters. For example, different subapertures within the array have relative polarity or phasing as compared to other subapertures within the transmit aperture.

In act 62, acoustic echoes are received in response to transmitted acoustic energy. Received echoes are transduced to electrical signals and processed for imaging. Depending on the depth of the scan, the receive process is performed over a 100, 200 or other microsecond time period.

In act 64, state change transmit waveforms are generated with the same transmitters. The transmit waveform of act 64 is used to switch the polarity or change the state of one, a plurality or all of the transmitters in the transmit aperture. For example, one or more of the transmitters ends in a low state for generating an imaging transmit waveform of act 60. In preparation for subsequent imaging transmit waveforms, transmitters are switched from the low state to a high state. Alternatively, transmitters are switched from a high state to a low state. Some transmitters may be switched to or from different states than other transmitters. Some transmitters may remain in an ending state from the generation of the imaging transmit waveform in act 60. The switching of states generates acoustic energy. This generation of acoustic energy is performed sequentially after and adjacent in time to the imaging transmission of act 60.

The switching of the states of the transmitters in act 64 is performed to position the transmitters at a starting state for a subsequent transmission. Different techniques may use different starting states. For example, a single transmission is provided along each scan line where some of the transmitters generate waveforms with different polarities, such as 180° out of phase, as other transmitters for a given transmission. As another example, the transmitters all have a same starting state or polarity for a first transmission and then opposite starting states or polarity for a second transmission along a same or adjacent scan lines.

FIG. 6 shows a timing diagram of one embodiment of changing a state of one or more transmitters in act 64 based on an ending state from an imaging transmission of act 60. An 80 megahertz clock signal is shown at 80, but other clock frequencies may be used. The left most portion 81 of the timing diagram represents a state change in act 64, and the right most portion 83 represents generation of an imaging transmit waveform, such as associated with acts 60 or 66. A group counter is provided at 82 for providing course adjustment at a lower frequency operation, such as 5 megahertz, to save power. In one embodiment, each group includes nine elements, but other numbers of elements or groupings may be provided. A different tap or a plurality of different taps is provided for each element as a function of the desired delay. For example at 84, an element N is assigned a tap 10 within group 6 of the group counter and an element M is assigned tap 6 as shown at 86. If the transmitter associated with element N is in a state of zero, such as a zero volt state, and the subsequent starting state is also a zero state, then at tap 10 the transmitter of element N is maintained in a same state at 88. Conversely, element M was previously ended in a zero state but is assigned a high state or one as a starting state for next imaging transmission. As shown at 90, the waveform state of element M is switched from a low to a high state at the delay tap 6. In act 64, the element N and its associated transmitter do not contribute to the generation of acoustic energy or a phantom waveform. Element M does contribute to the generation of acoustic energy.

The undesirable acoustic effects of the state change in act 64 is minimized by using different delay and/or waveform patterns than applied in act 60 for imaging. For example, one pattern of delays and waveforms is used for any of now known or later developed imaging transmission schemes. Additional delay and waveform patterns are used for the state change operation. A waveform pattern for state change is a single pulse or change, such as associated with changing from a high state to a low state or vice versa, without additional pulsing or switching. In addition or as an alternative to reducing acoustic defects by limiting the length or number of cycles of a waveform, a delay pattern is used to minimize the acoustic effects by focusing a pressure wave in a least or lesser offensive direction or by scattering the pressure wave across the median or region to be scanned.

The switch of states or polarity of act 64 is repeated for a plurality of transmitters in one embodiment, such as being performed once for each of the transmitters at a substantially same time. Substantially is used to account for delay patterns to minimize acoustic effect. For example, the energy from the switching is spread as uniformly as possible to distribute the energy, resulting in weaker echoes. The transmission from switching states of the transmitters is defocused. In alternative embodiments, a partial focus may be provided for spreading the energy over a region that is less than an entire scan region or region to be imaged. As yet another alternative or additional embodiment, acoustic energy associated with the switching of states is focused away from the next scan line to be used. As little energy as possible is transmitted in the direction of the next imaging transmission. The phantom or undesired acoustic energy is steered in a different direction. Any of various directions may be used. Where the imaging transmissions are along more than one scan line in a transmit event, the acoustic energy from switching states of the transmitters is steered away from both or each of the scan lines for the subsequent transmission. The delay pattern associated with steering the acoustic energy away from the next to be used scan lines varies as a function of time as different transmit events are performed to scan along different scan lines.

Since the acoustic energy generated in act 64 is for switching the states of the transmitters rather than receiving imaging echoes, a receive operation is not performed in response to the generation of transmit waveforms of act 64. Receiving echo signals in response to the state change is substantially avoided. Substantially avoiding is used to account for some reduced amplitude echoes from the state change impinging upon the transducer during a subsequent reception step for imaging. The undesired echoes may be relatively small as compared to echoes from an imaging transmission. By minimizing the acoustic effects, such as by defocusing or steering away, subsequent transmission and reception acts may occur immediately or soon after the transmission of act 64 without receiving undesired acoustic energy due to act 64. Some delay may be provided to minimize receiving acoustic echoes from the state change transmission.

In act 66, additional imaging transmit waveforms are generated with one or more transmitters. The imaging transmit waveform begins at the ending state of the transmitters due to either of acts 60 or 64. In one embodiment, the imaging transmission of act 66 is performed within about 50 microseconds, such as about 10 microseconds, after the change of states of act 64. In one embodiment, the switch of polarity or state allows for generation of transmit waveform with a polarity different than a polarity used for the imaging transmission of act 60. Alternatively, the switch allows a same polarity for both acts 60 and 66. The generation of transmit waveforms for imaging is repeated substantially simultaneously across the transmit array or aperture for each of a plurality of channels in the same or different aperture and channels than used for the first imaging transmission in act 60. A delay profile is applied across the aperture. The delay profile is operable to focus acoustic energy substantially along one or more scan lines within the region of interest, such as substantially along the same or adjacent scan lines as used in the imaging transmission of act 60. In alternative embodiments, the delay profile is selected to focus acoustic energy along a different scan line than used in act 60, such as scan lines that are adjacent to or spaced away from the scan lines used in act 60.

Referring to the right half or portion 83 of FIG. 6, the generation of the transmit waveform in act 66 for elements N and M is shown. The group counter switches over to operation pursuant to a fine delay signal represented at 92, such as operating at the 80 megahertz clock signal. Each element is assigned a delay and associated tap. For example, element N is assigned tap 11 and element M is assigned tap 12 associated with delays for imaging transmission along a scan line. As shown at 84 and 86, the waveform is initially toggled or began after a count to taps 11 and 12 for elements M and N, respectively. In response and as shown at 88 and 90, the transmitter associated with each of the elements changes states, such as going from a low to a high state for element N and from a high to a low state for element M. After a programmable amount of time, such as associated with 3 or 4 clock cycles, the waveform is toggled again to change states yet again, resulting in generation of a unipolar pulse. Any number of cycles and duty cycles may be used for the unipolar transmissions of one or both of the elements.

In act 68, echo signals are received in response to the imaging transmission of acts 66. The transmit waveform is converted to an acoustic energy. The acoustic energy propagates along one or more scan lines based on the delay pattern. The acoustic energy reflects off of structures or boundaries within the tissue, and the reflections that impinge upon the transducer are converted to electrical signals. The electrical echo signals are then used for generating an image.

In one embodiment, the echo signals received in acts 62 and 68 are used to generate an image. The echoes are associated with different or the same scan lines and are detected independent of each other for forming the image. In another embodiment shown in FIG. 5, the echo signals from acts 62 and 68 are combined in act 70. The relative polarities between the transmission in acts 60 and 66 are used in the combination of act 70 to isolate desired information. For example, transmit waveforms 180° out of phase are transmitted in the two sequential acts. By summing the responsive echoes, information at a fundamental frequency is canceled and information at a second harmonic or even harmonic frequencies is maintained. Any of various now known or later developed combinations may be used, such as weighted averaging with uniform or different weights of all positive, all negative or both positive and negative weights. Any now known or later developed transmission and reception patterns and associated combination techniques may be used. The combination is prior to detection, but may be a combination of detected data.

The acts of FIG. 5 are repeated for different scan lines. Since the scan lines are along different directions, different ones of the channels, elements or transmitters may use the switch of state or polarity of act 64. For example, different waveform polarities are used in a single transmit event for different subapertures. The polarity of any given element and the selection of subapertures is a function of the scan line direction or focal location. For different scan line directions, different polarity settings are used. For each sequential transmission along different scan lines, different transmitters may have a same or different starting state.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A beamformer system for minimizing acoustic disruption in ultrasound imaging, the system comprising:
    a transmit beamformer configured to sequentially generate a first transmission and a second transmission of acoustic energy in response to a first delay pattern and a second delay pattern, respectively, the first delay pattern corresponding to minimizing acoustic energy in a region of interest, and the second delay pattern corresponding to focusing acoustic energy along a scan direction within the region of interest, the second transmission occurring within an amount of time after the first transmission, the amount of time insufficient to allow echoes of the first transmission from locations in the region of interest to die out, the first transmission configuring transmitters of the transmit beamformer at start positions for the second transmission;
    a receive beamformer configured to receive echo signals in response to the second transmission and substantially not receive echo signals in response to the first transmission;
wherein the transmit beamformer is configured to generate a third transmission, and where the receive beamformer is configured to isolate information in response to a combination of echo signals received in response to the second transmission and the third transmission as a function of a relative polarity between waveforms of the second and third transmissions.

2. The system of claim 1 wherein the transmit beamformer comprises a unipolar transmitter switchable between high and low states, the first transmission corresponding to switching the unipolar transmitter between the high and low states in preparation for the second transmission.

3. The system of claim 1 wherein the transmit beamformer comprises unipolar transmitters switchable between high and low states, the first transmission corresponding to switching the unipolar transmitter between the high and low states after the third transmission and in preparation for the second transmission.

4. The system of claim 1 further comprising:
    a transducer element having a first electrode on a first side connected with the transmit beamformer and a second electrode on a second side opposite the first side connected with the receive beamformer.

5. The system of claim 1 wherein the first delay pattern is configured to defocus the acoustic energy as compared to the second delay pattern.

6. The system of claim 1 wherein the first delay pattern is configured to defocus the acoustic energy.

7. The system of claim 1 wherein the first delay pattern focuses the acoustic energy away from a scan direction of the second delay pattern where the second transmission is transmitted sequentially after and adjacent to the first transmission.

8. The system of claim 1 wherein the second transmission is within about 50 microseconds of the first transmission.

9. A method for minimizing acoustic disruption in ultrasound imaging, the method comprising:
    (a) generating a first transmit waveform with a first transmitter, the first transmitter beginning at a first beginning state and ending at a first ending state for the first transmit waveform, the first transmit waveform being one or more cycles;
    (b) generating a second transmit waveform with the first transmitter, the second transmit waveform beginning at the first ending state and ending at a second ending state different than the first ending state and being a single transition from the first ending state to the second ending state without further transition, the second transmit waveform being less than one cycle;
    (c) generating a third transmit waveform with the first transmitter, the third transmit waveform beginning at the second ending state, the third transmit waveform being one or more cycles;
    (d) receiving first echo signals in response to the first transmit waveform;
    (e) receiving third echo signals in response to the third transmit waveform;
    (f) substantially avoiding receiving second echo signals in response to the second transmit waveform; and
    (g) combining the first and third echo signals.

10. The method of claim 9 wherein (a) comprises generating the first transmit waveform with a first polarity, (c) comprises generating the third transmit waveform with a second polarity different than the first polarity and (b) comprises switching the transmitter to the second polarity.

11. The method of claim 9 wherein (a), (b) and (c) comprise generating unipolar waveforms.

12. The method of claim 9 wherein (a) is repeated substantially simultaneously for each of a plurality of channels in a first aperture, (b) is repeated substantially simultaneously for at least two of the plurality of channels and (c) is repeated substantially simultaneously for each of the plurality of channels in a third aperture of the same or different channels as the first aperture, each of (a), (b) and (c) performed sequentially without intervening generation of transmit waveforms;
    further comprising:
    (d) applying a first delay profile for the first aperture, the first delay profile operable to focus acoustic energy substantially along a scan line within a region of interest;
    (e) applying a second delay profile for the at least two of the plurality of channels to minimize acoustic energy along the scan line; and
    (f) applying a third delay profile for the third aperture, the third delay profile operable to focus acoustic energy substantially along the scan line within the region of interest.

13. The method of claim 12 wherein (a), (b), (c), (d), (e) and (f) are repeated for different scan lines, the at least two of the plurality of channels of each repetition of (b) being a function of a direction of the scan line.

14. The method of claim 12 wherein (e) comprises defocusing the transmission from the at least two of the plurality of channels for (b).

15. The method of claim 12 wherein (e) comprises focusing acoustic energy away from the scan line.

16. A method for minimizing acoustic disruption in ultrasound imaging, the method comprising:
(a) generating, with a first transmitter, a first transmission in response to a first delay pattern, the first delay pattern corresponding to minimizing acoustic energy in a region of interest;
(b) generating, with the first transmitter, a second transmission in response to a second delay pattern, the second delay pattern corresponding to focusing acoustic energy along a scan direction within the region of interest;
(c) receiving echo signals in response to the second transmission and substantially avoiding receiving echo signals in response to the first transmission;
(d) generating a third transmission, wherein the first transmission occurs between the second and third transmissions;
(e) receiving echo signals in response to the third transmission; and
(f) combining the echo signals received in response to the second transmission and the third transmission, the second and third transmissions corresponding to the second and the third different polarities, respectively.

17. The method of claim 16 wherein (a) comprises generating a unipolar transmission having high and low states, the unipolar transmission corresponding to switching a unipolar transmitter between the high and low states in preparation for the second transmission.

18. The method of claim 16 wherein (a) comprises switching a unipolar transmitter between high and low states, the first transmission corresponding to switching the unipolar transmitter between the high and low states after the third transmission and in preparation for the second polarity of the second transmission.

19. The method of claim 16 wherein (a) and (b) comprise generating the first and second transmissions with a unipolar transmitter operable to end a transmission in either of two states.

20. The method of claim 16 wherein (a) comprises generating the first transmission with the first delay pattern operable to defocus acoustic energy.

21. The method of claim 16 wherein (a) comprises generating the first transmission with the first delay pattern operable to focus acoustic energy away from a scan direction of the second delay pattern where the second transmission is transmitted sequentially after and adjacent to the first transmission.

22. The method of claim 16 wherein (b) is performed within at most about 50 microseconds after (a).

23. A method for minimizing acoustic disruption in ultrasound imaging, the method comprising:
(a) changing a state of a least two transmitters wherein the change of state is operable to generate acoustic energy;
(b) reducing an acoustic effect of (a) and substantially not receiving echo signals in responds to (a);
(c) transmitting a first acoustic energy with the at least two transmitters after (a) and (b) and within an amount of time after (a) and (b), the amount of time insufficient to allow echoes caused by (a) from locations in a region of interest to die out, the changing of the state configuring the at least two transmitters to be at start positions for the transmitting of (c); and
(d) receiving acoustic echoes in response to (c);
(e) transmitting a second acoustic energy with the at least two transmitters prior to (a) and (b);
(f) receiving acoustic echoes in response to (e); and
(g) isolating information as a function of a relative polarity of the transmitted acoustic second and first energies of (e) and (c), respectively.

24. The method of claim 23 wherein (b) comprises defocusing the acoustic energy generated in (a).

25. The method of claim 23 wherein (b) comprises focusing the acoustic energy generated in (a) away from a scan line and (c) comprises transmitting along the scan line.

* * * * *